(No Model.) 4 Sheets—Sheet 1.

J. HAWKYARD.
PREPAYMENT GAS METER.

No. 579,871. Patented Mar. 30, 1897.

WITNESSES
Geo. C. Abbe.
Louis Henke

INVENTOR
John Hawkyard
by Howson and Howson
his Attorneys (No Model.) 4 Sheets—Sheet 2.
J. HAWKYARD.
PREPAYMENT GAS METER.
No. 579,871. Patented Mar. 30, 1897.
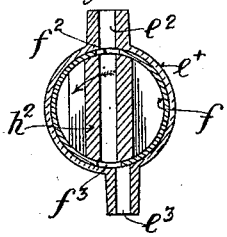
Fig. 6
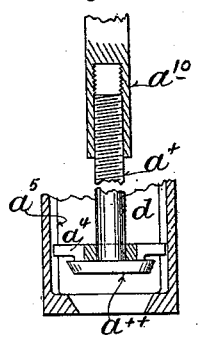
Fig. 3ª
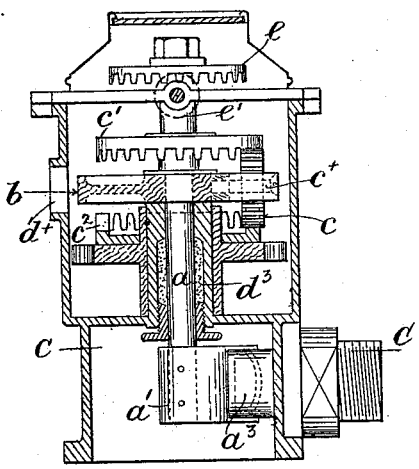
Fig. 3.
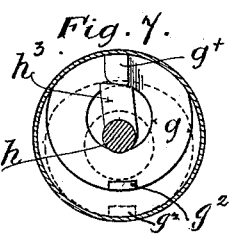
Fig. 7.
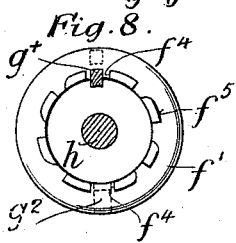
Fig. 8.
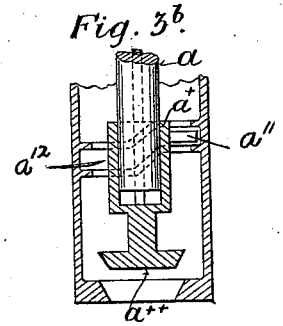
Fig. 3ᵇ.
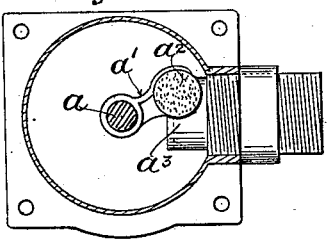
Fig. 4.
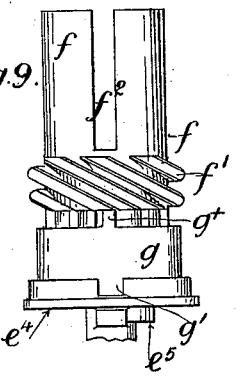
Fig. 9.
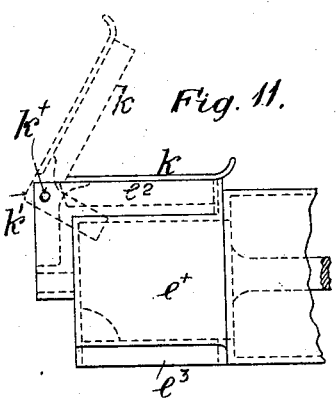
Fig. 11.
Fig. 5.
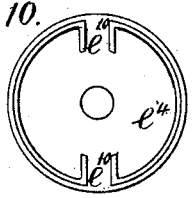
Fig. 10.
WITNESSES
Geo. C. Abb.
Louis Wenke
INVENTOR
John Hawkyard
by Howson & Howson
his Attorneys (No Model.) 4 Sheets—Sheet 3.
J. HAWKYARD.
PREPAYMENT GAS METER.
No. 579,871. Patented Mar. 30, 1897.
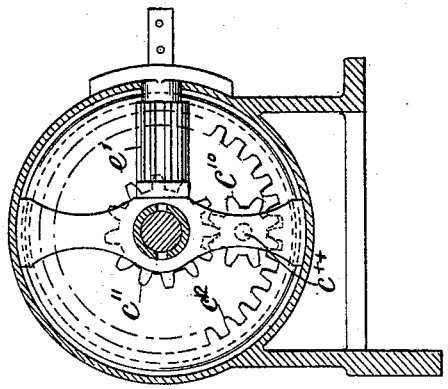
FIG. 3ᵈ.
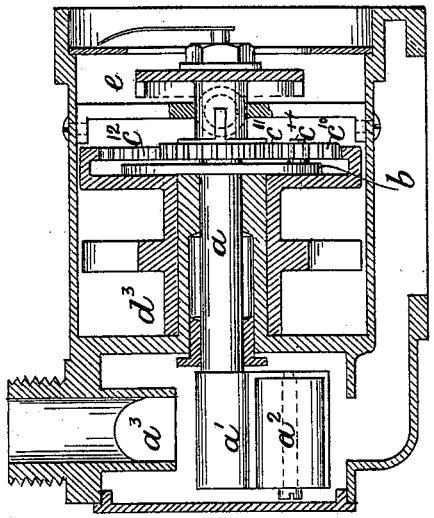
FIG. 3ᶜ.
Witnesses
F. W. Wright.
S. C. Connor
Inventor
John Hawkyard.
By
Howson & Howson
his Attorneys (No Model.) 4 Sheets—Sheet 4.
J. HAWKYARD.
PREPAYMENT GAS METER.
No. 579,871. Patented Mar. 30, 1897.
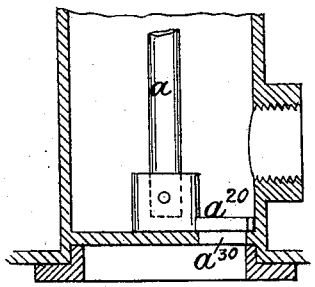
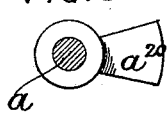
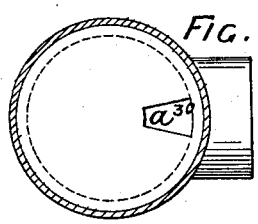
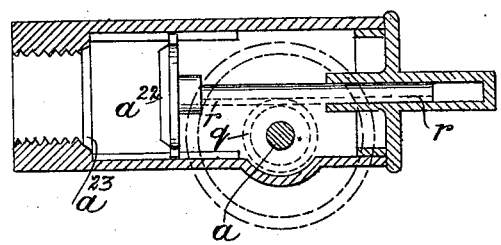
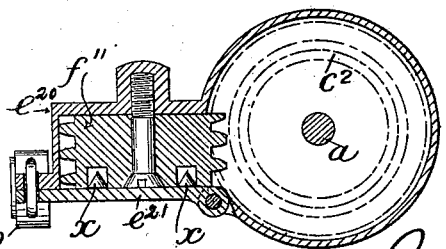
Witnesses
F. W. Wright
S. C. Connor
Inventor
John Hawkyard
By
Howson & Howson
his Attorneys

UNITED STATES PATENT OFFICE.

JOHN HAWKYARD, OF SADDLEWORTH, ENGLAND, ASSIGNOR TO JOSEPH BRADDOCK, OF OLDHAM, ENGLAND.

PREPAYMENT GAS-METER.

SPECIFICATION forming part of Letters Patent No. 579,871, dated March 30, 1897.

Application filed May 19, 1896. Serial No. 592,143. (No model.)

*To all whom it may concern:*

Be it known that I, JOHN HAWKYARD, a subject of the Queen of Great Britain, residing at Saddleworth, in the county of York, England, have invented Improvements in or Applicable to Prepayment Gas-Meters, of which the following is a specification.

This invention relates to such gas-meters (either wet or dry) as are provided with apparatus for supplying a definite amount of gas upon prepayment either to the gas-supplying authorities or into a device (combined with this apparatus) for receiving a coin or coins or a token or tokens by means of which the apparatus is set free.

The invention will be readily understood from the following description on reference to the accompanying drawings.

Figure 1:
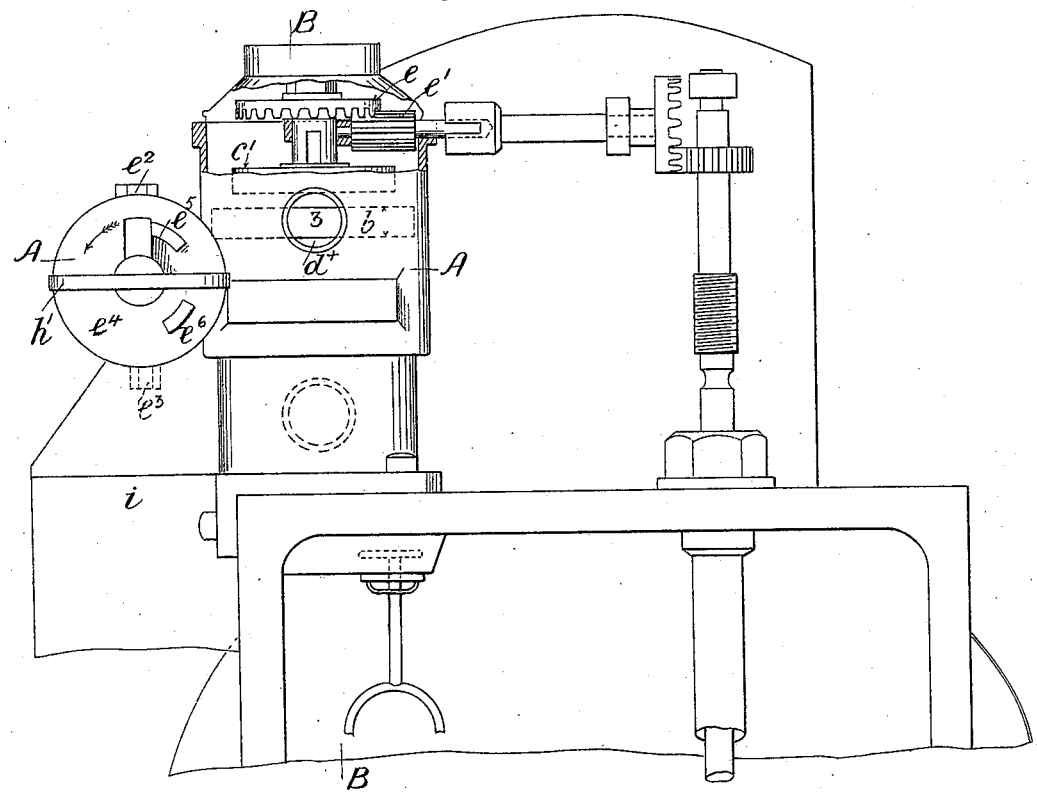
Figure 2:
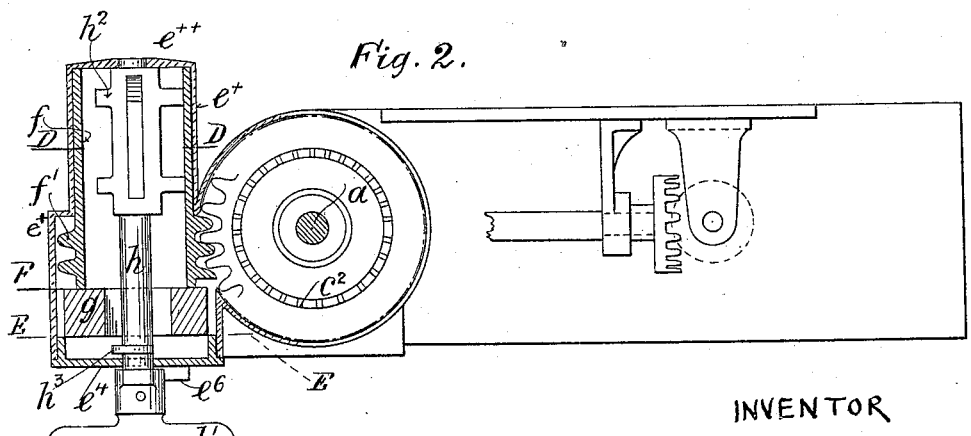

Figure 1 is a front elevation of so much of a wet gas-meter as is necessary to illustrate the invention applied thereto. Fig. 2 is a plan view, partly in section, at about the line A A on Fig. 1. Fig. 3 is a vertical section through the line B B on Fig. 1. Figs. $3^a$, $3^b$, $3^c$, $3^d$, $3^e$, $3^f$, $3^g$, $3^h$, and $3^i$ illustrate modified means of actuating the valve by the primary spindle, tube, or sleeve hereinafter described. Fig. 4 is a section through the line C C on Fig. 3. Fig. 5 is a detached plan view of the disk $b$, which carries the rolling pinion or wheel $c$ of the epicyclic train hereinafter referred to. Fig. 6 is a section through about the line D D on Fig. 2. Figs. 7 and 8 are sections through the coin-receiving device at about the points E F, respectively, on Fig. 2. Fig. 9 is a plan view of detached parts hereinafter more particularly referred to. Fig. 10 is an inside or back view of one end of the fixed coin-receiving cylinder. Fig. 11 is a side view of part of the other end of the said coin-receiving cylinder, illustrating the application of a safety or locking device hereinafter more particularly described.

The apparatus consists mainly of a suitable primary shaft or spindle $a$, or it may be a sleeve or tube, as hereinafter described, mounted in the framework of the apparatus, so that it may revolve or oscillate freely. Upon one end (or at any convenient point) of this shaft or spindle may be fixed an arm or lever $a'$, which carries a suitable valve $a^2$, which can be removed from or brought to its seating $a^3$ to open or shut off the gas-supply by the oscillation of the said primary shaft or spindle $a$; or if a sleeve or tube $a^{10}$ is employed, as seen at Fig. $3^a$, it may be suitably screwed (internally, by preference, as shown) and may work upon or in (as the case may be) a corresponding threaded secondary spindle $a^+$ or tube free to move longitudinally, and such movement may be employed to directly, as shown, or indirectly open and close any suitable gas-valve $a^{++}$ controlling the gas-supply to or from the meter. At a suitable point upon the primary shaft, spindle, sleeve, or tube $a$ first mentioned is secured or fixed a disk $b$ or an arm or its equivalent, upon which is suitably mounted the rolling wheel $c$ or pinion of an epicyclic train, and the two crown-wheels $c'$ $c^2$ are loosely mounted upon the aforesaid shaft, spindle, sleeve, or tube $a$ or $a^{10}$ and both gear with the rolling wheel or pinion $c$.

It will be evident without further illustration that bevels or ordinary spur-gearing may be employed instead of the crown-wheels $c'$ $c^2$ and pinion $c$ to form the epicyclic train, if preferred. In any case one of the driving-wheels $c^2$ of the epicyclic train is actuated directly or indirectly by or from the coin or its equivalent and moves the rolling wheel or pinion $c$, and therefore the central primary shaft $a$, in one direction, through which action the valve $a^2$ is opened, as already intimated, while the other driving-wheel $c'$ of the epicyclic train is actuated by the working of the meter in the opposite direction to the aforesaid driving-wheel $c^2$ and moves the rolling wheel or pinion $c$, and therefore the central primary shaft $a$ or $a^{10}$, in the reverse direction for the purpose of closing the valve $a^2$.

It will be evident that instead of employing a secondary screwed spindle $a^+$ or tube acted upon by a primary screwed sleeve $a^{10}$ or its equivalent, as already described, the secondary spindle or tube may be moved endwise to open and close a valve. For example, the primary shaft $a$ or tube $a^{10}$ may be provided with a long key or feather (see Fig. $3^b$) or its equivalent, and the secondary tube $a^+$ or spindle rotate therewith, but being provided with a pin or projection $a^{11}$, fitting in a fixed grooved cam-path $a^{12}$, it will raise or lower the valve $a^{++}$ to admit or cut off the gas-supply. Any suitable stuffing-box $d^3$ or its equivalent may, if necessary, be placed at any convenient point between the aforesaid valve $a^2$ and the epicyclic train $c\ c'\ c^2$.

If the valve $a^{++}$, Fig. $3^a$, is attached to the secondary spindle $a^+$ or tube, moved endwise by means of the primary threaded sleeve $a^{10}$ or spindle $a$, or by means of a cam, its rotation along with the primary screwed spindle $a$ or tube $a^{10}$ or its equivalent may be prevented and a longitudinal movement of the valve $a^{++}$ secured by any suitable projection or projections or snugs $a^4$, working or sliding in or upon suitable grooves $a^5$ in the valve-box or valve-chamber $d$.

The valve-box $d$ may be in any convenient position to suit the circumstances of the case. The spindle or tube $a$ may be vertically or horizontally mounted, and the whole apparatus may be applied to the inlet or outlet of the meter.

The meter-driven wheel $c'$ of the epicyclic train $c\ c'\ c^2$ may be suitably connected to a readily-detachable crown change-wheel $e$, driven by a long fixed pinion $e'$, actuated by the meter mechanism, so that the size—i. e., number of teeth—of the crown-wheel $e$ will determine the rate at which the valve controlling the gas-supply is closed, and in this manner variations in the price of gas may be arranged for, or any other suitable form of change-wheels may be employed for the like purpose.

To show the value or amount of gas prepaid but unconsumed, or the position of the valve, a suitable indicator may be actuated by or from either the aforesaid primary shaft or spindle or the screwed sleeve or tube; or, if preferred, a ring carried by the arm or disk $b$ or the rim or other convenient part of the disk $b$, carrying the rolling wheel or pinion $c$, may be divided into any suitable number of spaces or divisions, or it may be enameled or engraved or arranged to carry any suitable figures, letters, or marks to form an indicator to represent or show the value or amount of the gas prepaid and unconsumed through a suitable opening $d^+$ made in the cover or framework for that purpose.

Any convenient form of coin-receiving device may be employed if one of the driving-wheels of the epicyclic train is fixed to or formed with a toothed or ratchet wheel, or its equivalent, which is actuated directly or indirectly by a coin or token in a receiver, but the form of coin-receiving mechanism I prefer to use is constructed as follows: The essential parts of this coin-receiving device consist of an outer cylinder or casing $e^+$, which may be cast or fixed upon the ordinary framework of the automatic apparatus, preferably in a horizontal position, as shown. One end $e^{++}$ of this cylinder may be "cast in," (see Fig. 2,) and on the upper and lower surfaces and near the cast-in end $e^{++}$ are two slots $e^2\ e^3$, one almost but not immediately opposite the other (see Fig. 6) and both running in a longitudinal direction, the size of the slots being sufficient for the free insertion of a proper coin. Inside and revolving in this cylinder $e^+$ is a second cylinder $f$, (see also Fig. 9,) of the same outer diameter as a proper coin, having both ends open and also two longitudinal slots $f^2\ f^3$ directly opposite to each other at or near to one end and somewhat wider than the two slots $e^2\ e^3$ in the first-named cylinder $e^+$. At the opposite end is a worm $f'$ or a spur-wheel, and also suitable notches $f^4$ (see Fig. 8) and ratchet-shaped teeth $f^5$ for the purpose of securing and of preventing backward rotation of the cylinder $f$. Abutting against the end of this inner cylinder $f$ is an annular or other suitable weight $g$, having on one side a suitably-arranged tooth $g^+$ to gear or lock with the aforesaid notches $f^4$ and teeth $f^5$ on the end of the inner cylinder $f$, while on its opposite side are two projections $g'\ g^2$, which slide in suitable vertical grooves $e^{10}$ in the detachable end $e^4$ (shown detached at Fig. 10) of the outer cylinder $e^+$. Passing through holes in the center of the two ends of this outer cylinder $e^+$ is a spindle or shaft $h$, which is capable of an oscillating motion. The extent of this oscillatory motion is regulated by a suitably-arranged handle $h'$ and two stops $e^5\ e^6$ on the outside of the detachable end $e^4$ of the outer cylinder, the handle $h'$ being fixed on the projecting end of the central spindle or shaft $h$. On this central spindle $h$ and immediately under the aforesaid slots is fixed or formed a rotatable coin-carrier $h^2$, so formed that it can conveniently revolve without touching the inside of the second cylinder $f$, and having a slot right through it (see Figs. 2 and 6) of such size and in such position that the proper coin on being put through the upper slot of the outer cylinder $e^+$ can just pass through the slots of the second cylinder $f$ and coin-carrier $h^2$, and thus lock these two together. The slot in the coin-carrier $h^2$ is so formed at the lower part (see dotted lines, Fig. 11) that a proper coin cannot slip through the slot $e^3$ while passing round in the direction of the arrow to work the cylinder $f$, but if it be attempted to work the apparatus with a small coin, say of less value, it will drop from the coin-carrier $h^2$ and through the slots $f^3\ e^3$ without working the cylinder $f$, as the slots in the cylinder $f$ are broad enough to allow of this action. The slots $f^2\ f^3$ being broader than $e^2\ e^3$, as shown, the cylinder $f$ cannot be reached when the apparatus is at rest and so moved by a knife or other instrument without a coin. Upon the central spindle $h$ is also cast or fixed a suitable cam $h^3$, so placed as to come in contact with and lift one, $g'$, of the projections $g'\ g^2$ on the annular weight $g$, which slide in the aforesaid vertical grooves $e^{10}$ on the detachable end $e^4$ of the outer cylinder $e^+$.

The action of this contrivance is as follows: When the central spindle is in its normal position, the single projection $g^+$ on the side of the annular weight $g$ is resting in one of the notches $f^4$ on the end of the inner cylinder $f$, thus securely locking the inner cylinder $f$ and preventing its rotation in either direction, (see Fig. 8 and dotted position, Fig. 7;) but when the handle $h'$ of the central spindle is turned till it comes in contact with the upper stop $e^5$, cast on the outside of the detachable cylinder end $e^4$, the cam $h^3$, acting on the projection $g'$, has lifted the annular weight $g$, so that the inner cylinder $f$ has become disengaged by raising $g^+$ from the notch $f^4$ and is free to revolve. (See Fig. 7 and dotted position, Fig. 8.) The slots are also in such a position (see Fig. 6) that the proper coin may be passed through the upper slot $e^2$ of the outer cylinder $e^+$ and into the slots $f^2 f^3$ of the inner cylinder and into the slot in the carrier $h^2$, thus effectually locking the cylinder $f$ and carrier $h^2$ together, so that when the handle $h'$ is revolved till it comes in contact with the lower stop $e^6$ on the detachable end $e^4$ the inner cylinder $f$ has been carried round through half a revolution of the coin, although the coin-carrier $h^2$, as seen on the drawings, makes rather more than half a revolution. At this point the coin is at liberty to fall through the lower slot $e^3$ of the outer cylinder $e^+$ into some suitable receptacle $i$ or money-box and the projection $g^+$ on the the annular weight $g$ has fallen into a notch $f^4$ on the end of the inner cylinder $f$ and securely locked it, the aforesaid projection $g^+$ on the annular weight $g$ having also prevented backward rotation of the inner cylinder $f$ by means of the aforesaid ratchet-shaped teeth $f^5$ on the end of the latter. It will be evident that while the inner cylinder $f$ is thus revolving it may by means of the aforesaid worm $f'$ or spur-wheel (if a spur-wheel is used) on the end of it be made to actuate the first-motion wheel $c^2$, and thereby the remaining mechanism of the automatic apparatus. As a further safeguard against fraud a bell-crank lever $k k'$ (see Fig. 11) may be so fixed on a pivot or axis $k^+$ in the outer end of the upper slot $e^2$ in the outer cylinder $e^+$ that the upper limb $k$ thereof shall lie in or upon or over the said coin-slot $e^2$, and the lower limb $k'$ shall always enter and lock the inner cylinder $f$ and carrier $h^2$ when the upper or horizontal limb $k$ is lifted out of or off the aforesaid upper slot $e^2$ for the purpose of inserting a coin, and when the coin has been inserted into the slots of the inner cylinder $f$ and carrier $h^2$ it will keep the upper slot $e^2$ of the outer cylinder $e^+$ covered over or closed until the coin has been passed through into the receptacle for holding the prepaid coins.

If the epicyclic train is composed of bevel or crown wheels, such as $c'$ $c^2$, the bevel or spur pinion $c$ will be carried upon an arbor on pin $c^+$, set radially to the primary shaft or spindle, (see Figs. 3 and 5,) but if it is composed of a spur-wheel $c^{11}$, working inside an internally-toothed wheel $c^{12}$, the rolling pinion $c^{10}$, gearing with both, will be carried upon an arbor or pin $c^{++}$ parallel to the primary shaft or spindle, (see Figs. $3^c$ and $3^d$,) but in any case the pinion $c$ or $c^{10}$ will revolve with the shaft $a$, as already intimated.

If the apparatus is to be used without a coin-receiver, as seen at Fig. $3^e$, it is arranged that one of the driving-wheels, say $c^2$, of the epicyclic train can be set by hand, instead of being driven from the coin or token in a receiver, so as to indicate the amount prepaid and open the gas-supply valve $a^2$ $a^3$ upon the opening or removal of a sealed or locked cover by any authorized person. In this case a worm $f^{11}$ is used, but it is mounted alone in its casing $e^{20}$, the end $e^{21}$ of which is hinged and can be secured by a padlock $p$ after the worm has been set. In this case one-half of a revolution of the worm $f^{11}$ allows a certain definite amount, say one pennyworth, to be supplied, as in the case of the worm $f'$ of the coin-receiving device above described, and in order to insure accuracy in the turning of the worm one-half revolution and not a little more or less I make two recesses in the face of the worm, into which pegs $x$ on the end $e^{21}$ of the casing $e^{20}$ will fit when the worm has been turned one-half a revolution or several half-revolutions.

I would remark in conclusion that the oscillating motion of the primary shaft or spindle $a$ or its equivalent may be applied to open and close an oscillating slide-valve $a^{20}$, working over the opening $a^{30}$, (see Figs. $3^f$, $3^g$, and $3^h$,) or by means of a pinion $q$ and rack $r$ (see Fig. $3^i$) an ordinary reciprocating valve or slide-valve $a^{22}$, or any device equivalent to a screw or cam path before described, may be attached to the shaft or spindle $a$ to operate an ordinary conical or other valve directly or positively.

I claim as my invention—

1. In a gas-meter, the combination of the gas-valve and a primary spindle capable of reversed rotary motion, and adapted to directly and positively open and close the said gas-valve, with a pinion carried by the spindle, a coin or hand setting wheel and a meter-driven wheel rotating loosely on the said spindle and gearing with the said pinion, substantially as and for the purpose set forth.

2. In a gas-meter, the combination of a spindle capable of reversed rotary motion, and a valve carried by the said spindle, with a pinion also carried by the said spindle, and two wheels loosely mounted thereon, the said wheels adapted to engage the pinion to positively move the spindle in opposite directions, substantially as set forth.

3. The improved coin-receiving device consisting of a fixed cylinder, an inner cylinder for opening the valve and a weighted annular catch engaging the said inner cylinder, in combination with a coin-carrier provided with a handle and also with means for raising the said catch, the said carrier and inner cylinder adapted to be locked together by the proper coin, substantially as described.

4. An improved coin-receiving device consisting of a fixed cylinder, an inner cylinder adapted to open the valve, in combination with a coin-carrier, adapted to be locked to the inner cylinder by the proper coin, and a weighted catch engaging the inner cylinder until the coin-carrier is moved, and ratchet-teeth on the inner cylinder engaging with the said catch to prevent the backward motion of the inner cylinder, substantially as set forth.

5. The combination with the outer fixed cylinder or casing, and the inner cylinder and the coin-carrier for operating the gas-valve, of a lever adapted to normally close the coin-slot, but when raised to uncover the said slot and to lock the outer cylinder or casing and the inner cylinder and coin-carrier together, substantially as and for the purpose hereinbefore described.

In testimony whereof I have signed my name to this specification in the presence of two subscribing witnesses.

JOHN HAWKYARD.

Witnesses:
  CHARLES A. DAVIES,
  JNO. HUGHES.